Patented Oct. 20, 1925.

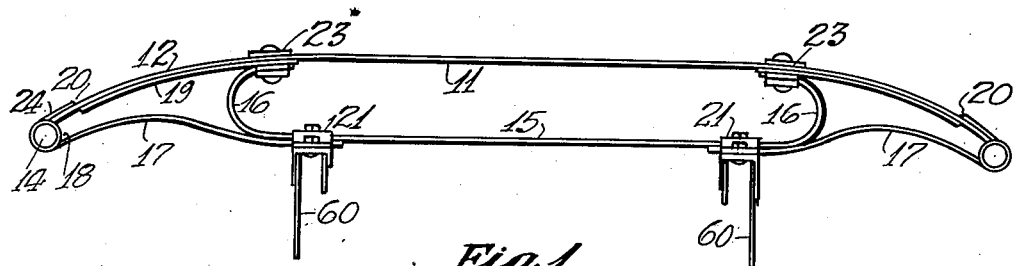

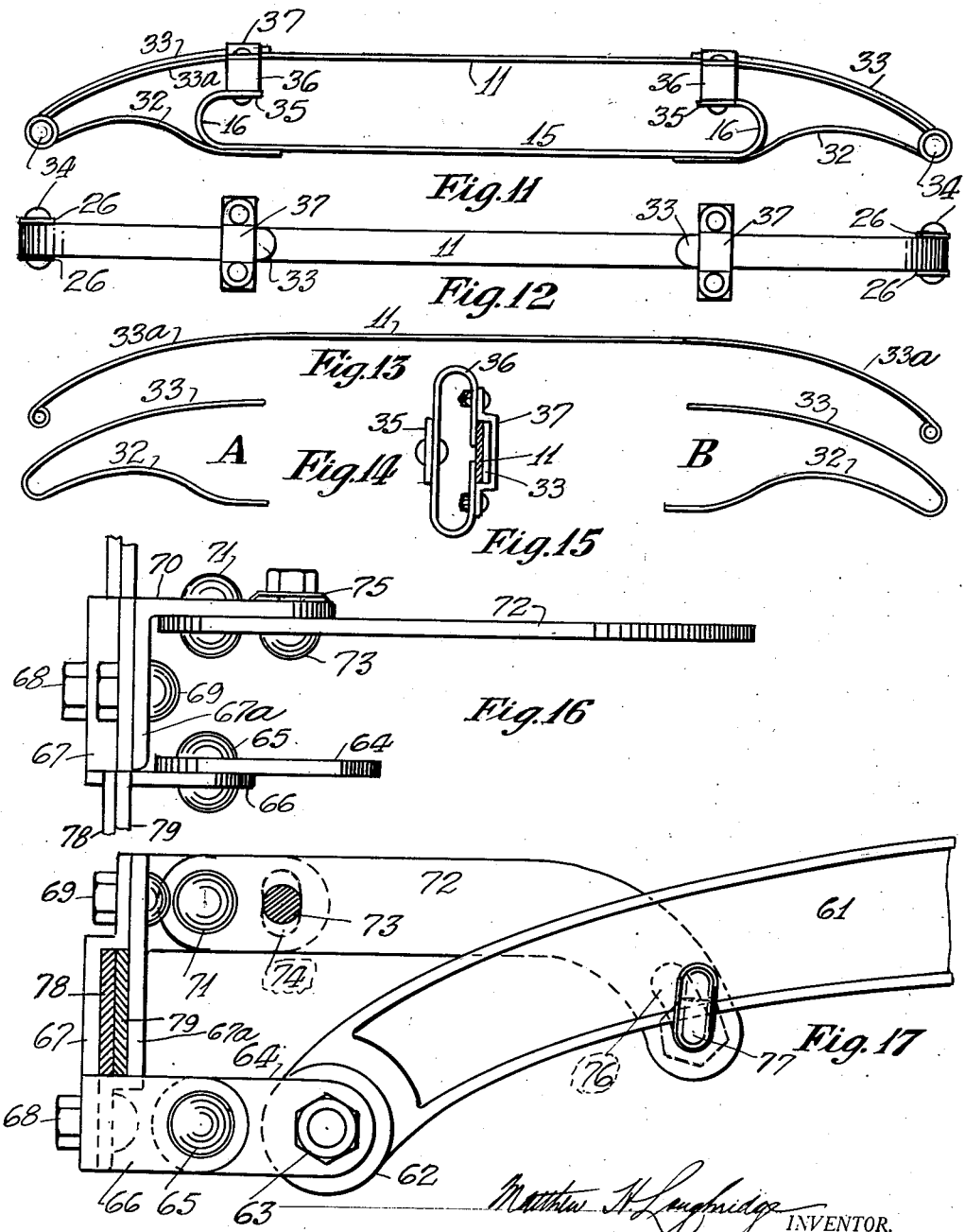

1,557,714

UNITED STATES PATENT OFFICE.

MATTHEW H. LOUGHRIDGE, OF BOGOTA, NEW JERSEY, ASSIGNOR TO COX CORPORATION, OF WILKES-BARRE, PENNSYLVANIA, A CORPORATION OF NEW JERSEY.

AUTOMOBILE BUMPER.

Application filed January 30, 1925. Serial No. 5,725.

*To all whom it may concern:*

Be it known that I, MATTHEW H. LOUGHRIDGE, a citizen of the United States, and a resident of Bogota, in the county of Bergen and State of New Jersey, have invented a certain new and useful Improvement in Automobile Bumpers, of which the following is a specification.

This invention relates to automobile bumpers of the spring bar type and has for an object to provide bumpers of this class constructed in unit parts which are readily replaceable, a bumper which is assembled without drilling the impact members, a bumper with a unit end piece which reinforces the impact bars and forms the contour of the rear of the bumper and a bumper which is easily assembled and disassembled for packing and shipping. This invention also includes a form of adjustable bracket for securing the bumper to the frame of an automobile in which the height and vertical angle of the bumper bar may be adjusted. Other objects of the invention will be more particularly understood from the following specification and the accompanying drawings, in which, Fig. 1, is a plan view and Fig. 2 is a front elevation of a double bar type of bumper constructed according to my invention, Figs. 3, 4, and 5 are top views of the component parts of the bumper, Fig. 6 is a detail of the end construction, Fig. 6ª is an alternative detail, Fig. 7 shows in section the application of the end post, Fig. 8, is a sectional view of the clamp through the emblem, Figs. 9 and 10 show in detail another form of end construction. Fig. 11 is a plan view and Fig. 12 is a front elevation of a single bar type of bumper constructed along the lines shown in Figs. 1 and 2, Figs. 13 and 14 are top views of the parts used in Figs. 11 and 12, Fig. 15 is an end elevation, partly in section, of the connection between the rear and the front bar, Fig. 16 shows one form of adjustable bracket that may be used with these forms of bumpers and Fig. 17 is a side elevation showing the bracket attached to the side frame of an automobile.

Bumpers, according to the present invention, are constructed with a front impact section and a rear section secured to the impact section at points intermediate its ends, the bumper being supported and secured to the automobile through the rear section. The ends of the impact section extend in the form of a cantilever and are reinforced by separate end sections which are similar for both ends of the bumper. These end sections are constructed in the form of loops with a rear member which acts as a wheel guard and are secured at one end to the impact member at points intermediate its ends and at the other end to the rear member by the supporting clamp of the bracket.

The bumper comprises essentially a front impact member, two end members and a rear member, these parts being clamped together at two points on the impact member and by the two brackets engaging the rear member. None of the parts are drilled except the ends of the rear member, the full strength of the material is thus maintained and the parts are readily assembled and disassembled and any unit part may be replaced without disturbing the other parts of the bumper.

The bracket comprises two vertical clamping plates engaging the rear bar of the bumper and secured at one end by a link to the shackle bolt of the frame and at the other end by a pivoted arm clamped to the side of the frame. By this arrangement the height of the clamping plates and their vertical angle can be adjusted and a locking bolt is provided to hold these parts in the adjusted position.

Referring to the drawings, 11 represents one of the impact bars and 11ª is a companion impact bar for the double bar type of bumper. These bars are deflected at the ends as indicated at 12 and have eyes 13 formed in the ends through which the end post 14, Fig. 7 is inserted to hold these bars, vertically, in parallel relation.

The rear member 15 consists of a flat bar 15 preferably of lighter stock than the impact bars and having turned over ends as indicated at 16 by means of which the impact bars receive a spring support from the rear bar.

The end members A and B are similar and interchangeable and are formed of flat bar stock similar to the rear bar 15. The end 19 is placed behind the cantilevered end of the impact bars at 12 and has a forward crimp at 20 where it projects through the opening between the bars 11 and 11ª to the front of the bumper as indicated at 24. The bars 11 and 11ª are notched at the ends to provide sufficient space for 24 to pass through as shown in Fig. 2. The end members are looped at 18 to a radius much greater than the eyes 13 so that the impact members 12 have a free movement at the ends independent of the end pieces. The inner portion of the end pieces is concaved as indicated at 17 forming a wheel guard and protecting the overhanging ends of the impact member from the rear.

The bumper is assembled by setting up the front bars as shown in Fig. 2 with the end posts 14 and the washers 26 and spacer 22. This unit can easily be shipped in this form. The end 19 is then inserted at 24 to the position shown in Fig. 6, the rear member 15 is then placed in position as in Fig. 1, and the emblems 23 with the clamps 27 firmly secure the parts together by bolts 28, Fig. 8. The part 23 is rabbeted to receive the bars 11 and 11$^a$ and the clamp 27 is rabbeted to receive the bars 19 and 16. The bolt 28 passes through the ends of bars 16 and 19 and the clamping pieces 23 and 27 but does not pass through the impact bars 11 and 11$^a$. The end 17 and the rear bar 15 are clamped together by the clamp 21 of the bracket 60. The washers 26 project beyond the eyes 13 and act as a guard to protect the end of the bumper.

In the bumper described the end pieces comprise a single bar somewhat wider than the space between the impact bars. In the modification shown in Figs. 9 and 10, the end piece has a double bar formation 29, 29$^a$ looped into legs 30 and 30$^a$. These legs are spaced to align with the impact bars and are placed in front thereof as shown in Fig. 9, and with the rear side concaved as shown at 29. The legs 30 are clamped in position at 23$^a$ and the rear bars 29—29$^a$ are secured to 15 at 31. The bars 29 and 29$^a$ may be made of separate pieces suitably offset to be clamped by 21.

The single bar bumper comprises the impact bar 11 with the deflecting ends 33$^a$, Fig. 13. Overlapping the front of the impact bar is the front member 33 of the end loop which has the rear member 32 concaved as shown. This end loop encloses the projecting end of the impact bar and is held in alignment therewith by the washers 26 and the end post 34 so that the end of the impact bar has a free movement in the enlarged loop of the end piece. The end pieces A and B, Fig. 14 are similar and interchangeable.

The rear bar 15 is turned over at the ends and secured at 35 to the vertical elliptical springs 36—36. To the opposite side of 36 the impact bar 11 and the end of 33 are clamped by the clamping piece 37 as shown in Fig. 15. The spring 36 being placed at right angles to spring 35 increases the resiliency with which the impact bar is supported, the increased length of 36 increases the plane of the impact area of the bumper which is available to engage bumpers on other cars and it enables the clamping piece 37 to be secured in place without bolting through the bars 11 and 33.

It will be noted that in bumpers constructed as described, the back bar 15 connects the supporting brackets 60 so that a strain on the bumper does not tend to spread the automobile frame. The bar 15 also acts as a secondary bumper member after the impact bars have collapsed. The general features in the construction of the bumper can be maintained, however, even if bar 15 is not continuous as is necessary in certain types of rear bumpers. In general, bumpers are more liable to be injured on the projecting ends than in the centre. The reinforcing of the ends by this construction enables the bumper to resist greater shocks without materially increasing its weight. If the ends are dented the end loops can readily be removed and the parts straightened or replaced by new parts. The bumper itself has the contour of a closed loop with no open ends to hook on obstacles as the car changes its running direction. The parts are uniform and short in length and less expensive to handle in manufacture than longer parts would be.

The bumper is attached to the automobile frame by a clamping bracket similar to Figs. 16 and 17. The side frame 61 of the automobile to which the bracket is attached has an eye 62 to receive the shackle bolt 63 of the spring. On this bolt the link 64 is pivotally secured and at 65 is pivotally secured to the lug 66 of the clamping member 67. Secured to 67 by the bolts 68 and 69 is the companion clamping member 67$^a$ having the lug 70 to which the arm 72 is pivotally secured at 71. This arm is curved at the end where the contour of the frame so requires and is provided with a slotted opening 76 through which the hook bolt 77 is placed to engage 61 and clamp 72 firmly in place. The lug 70 is rigidly secured to the arm 72 by the locking bolt 73 in the slot 74 and provided with the spring washer 75 so that the pressure on these parts can be adjusted. The rear bars of the bumper are represented by 78 and 79 engaged by the clamping pieces 67 and 67$^a$ and arranged to pass over the lug 66.

The height of the bumper may be adjusted by moving link 64 on pivot 63. When the proper height is determined arm 72 is moved on pivot 71 and the hook bolt 77 is positioned so that the bumper bars are vertical or vertically deflected as desired. Lug 70 is then rigidly bolted to 72 and the hook bolt 77 tightened. The parallel motion between arms 64 and 72 enables the vertical height of the clamping members to be adjusted without changing the vertical deflection of the bumper.

When a bumper receives a sudden shock of considerable magnitude, it may, in some cases, tend to deflect the vertical angle of the impact bar and if the bumper can be forced to such an angle the force of the impact will be relieved. For this purpose the locking bolt 73 engages the lug 70 and the arm 72 through the spring washer 75 thereby introducing a yielding resistance in the movement of these parts and the bracket may be deflected by the arm 72 turning on bolt 77 and on pivot 71. In the construction shown in Fig. 6ª it will be noted that the bar 15 is not curved at the ends but the end 17 of the loop is curved at 16ª instead to connect with the impact bar.

Having thus described my invention, I claim:

1. In an automobile bumper of the class described, the combination of an impact bar and a supporting bar in rear thereof with reinforcing end pieces connected to the impact bar intermediate its ends and to the supporting bar and following the contour of the impact bar up to the connecting point.

2. In an automobile bumper of the class described, the combination of an impact bar and a supporting bar in rear thereof, with reinforcing end loops clamped to the impact bar and to the supporting bar and following the contour of the impact bar up to the clamping point.

3. In an automobile bumper of the class described, the combination of an impact bar and a supporting bar in rear thereof with reinforcing end loops interchangeable for each end following the contour of the impact bar, clamped to the supporting bar and forming closed rounded ends for said bumper.

4. In an automobile bumper of the class described, the combination of an impact bar and a supporting bar in rear thereof with reinforcing end loops following the contour of the impact bar, said loops being concaved in the rear member, clamped to the supporting bar and forming closed rounded ends for said bumper.

5. In an automobile bumper of the class described, the combination of an impact bar and a supporting bar in rear thereof with a reinforcing end loop, said impact bar having an eye in the end, and said loop passing around said eye and clamped to the rear bar.

6. In an automobile bumper of the class described, the combination of an impact bar having an eye in the end, a rear supporting bar, end loops connecting at intermediate points to said impact bar, said loops being larger in diameter than said eye and passing around said eye and attached to the rear bar.

7. In an automobile bumper of the class described, the combination of an impact bar having an eye at the end, a rear supporting bar, end loops connecting at intermediate points to said impact bar, said loops passing around said eye and connecting to the rear bar and means co-operating with said eye for holding said impact bar and loop in alignment.

8. In an automobile bumper of the class described, the combination of an impact bar having an eye at the end, a bolt in said eye with washers thereon, a rear supporting bar, end loops connecting to said impact bar at points intermediate its ends, said loops passing around said eye between said washers and connected to said rear bar.

9. A bumper of the class described comprising an impact bar, a rear supporting bar with ends bent forward engaging the impact bar intermediate its ends, end loops connected to the impact bar at the points where the supporting bar connects, said loops following the contour of the impact bar and clamped at the opposite end to the rear bar.

10. A bumper of the class described comprising an impact bar, a rear supporting bar with ends bent forward engaging the impact bar intermediate its ends, end loops reinforcing the projecting ends of the impact bar and following the contour of this bar, said loops bent to the rear and inwardly and one end clamped to the rear supporting bar.

11. A bumper of the class described comprising an impact bar, a rear supporting bar connected to said impact bar at points intermediate its ends, a reinforcing loop passing around the end of said impact bar and clamped to the rear bar and means whereby the end of said impact bar can be deflected to a limited extent independently of said loop.

12. A bumper of the class described comprising an impact bar, a rear supporting bar bent forward to connect with said impact bar, a reinforcing loop passing around the end of said impact bar with one end following the contour of said impact bar and the other end bent forward and rearwardly and inwardly and following the contour of the rear bar.

13. A bumper of the class described comprising a plurality of spaced impact bars, a rear supporting bar engaging said impact bars intermediate their ends, a reinforcing member for the ends of said impact bars, said member following the contour of said impact bars and passing through the space between said bars from the rear to the front of said bars.

14. A bumper of the class described comprising a plurality of spaced impact bars, a rear supporting bar engaging said impact bars intermediate their ends, a reinforcing member for the ends of said impact bars, said member following the contour of said bars and passing from one side to the other of said bars and being crimped where it crosses said bars.

15. A bumper of the class described comprising a plurality of spaced impact bars, a rear supporting bar engaging said impact bars intermediate their ends, a reinforcing bar for said ends of greater width than the space between said bars, said impact bars being notched so that said reinforcing bar can pass from one side to the other of said impact bars.

16. A bumper of the class described comprising a plurality of spaced impact bars, a rear supporting bar engaging said impact bars intermediate their ends, a reinforcing bar for said ends of greater width than the space between said bars, said bars being notched and said reinforcing bar being crimped so that it can pass from one side of said impact bars to the other side and follow the contour of said bars.

17. A bumper comprising a plurality of impact bars having eyes at the end and a post connecting said eyes, a rear supporting bar engaging the impact bars intermediate their ends, a reinforcing loop for said ends of greater width than the space between said bars, said bars being notched near said eyes to permit said loop to pass from the inside of said impact bars to the front of said bars and around said post.

18. A bumper of the class described comprising a plurality of impact bars having eyes at the end and connected by a post and spacer, a rear support engaging said impact bars intermediate their ends, a reinforcing loop for said ends passing around said spacer and of larger diameter than said spacer and one end clamped to said rear support.

19. A bumper of the class described comprising a plurality of impact bars having eyes at the end and connected by a post, a supporting bar in rear of said impact bars, a reinforcing loop for the ends of said impact bars, said loop passing around said post clear of said post, one end being clamped to said impact bars and the other end clamped to said rear bar.

20. A bumper of the class described comprising a plurality of parallel bars spaced apart, a rear supporting bar having its ends bent forward in a curve opposite the space between said parallel bars, an end loop having one end formed to the contour of said parallel bars placed opposite the space between said bars, the ends of said rear bar and said loop clamped to said parallel bars intermediate their ends and the other end of said loop bent rearwardly and inwardly and secured to said rear bar.

21. A bumper of the class described comprising a plurality of impact bars, a rear supporting member, an end loop passing around the end of said impact bars, one end of said loop passing partially in front and partially in rear of said impact bars and clamped to said bars intermediate their ends and the opposite end secured to said supporting member.

22. A bumper of the class described comprising a plurality of impact bars connected at their ends by a vertical post, a rear supporting member, end loops passing around said posts and having a free movement with respect to said posts, the ends of said loops secured to said impact members intermediate their ends and the opposite ends secured to said supporting member.

23. A bumper of the class described comprising a plurality of impact bars connected at their ends by a vertical post, a plurality of washers on said posts, a rear supporting member, end loops passing around said posts between said washers and having a free movement with respect to said posts, the ends of said loops secured to said impact members intermediate their ends and the opposite ends secured to said supporting member.

24. In a bumper of the class described, the combination of a unitary impact section, two similar end loops with one leg of each loop arranged to conform to the contour of the impact section, a supporting member in rear of said impact section, the other leg of said loop bent rearwardly and inwardly and clamped to said supporting member.

25. In a bumper of the class described, the combination of an impact section, two similar end loops and a supporting member, means for clamping said impact section, loops and supporting member together, a bracket engaging said supporting member and means including said bracket for adjusting the height and vertical angle of said impact member.

In witness whereof I have subscribed my name.

MATTHEW H. LOUGHRIDGE.